(12) United States Patent
Ostrovsky

(10) Patent No.: US 8,380,724 B2
(45) Date of Patent: Feb. 19, 2013

(54) GROUPING MECHANISM FOR MULTIPLE PROCESSOR CORE EXECUTION

(75) Inventor: Igor Ostrovsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 285 days.

(21) Appl. No.: 12/625,379

(22) Filed: Nov. 24, 2009

(65) Prior Publication Data

US 2011/0125805 A1 May 26, 2011

(51) Int. Cl.
*G06F 17/30* (2006.01)

(52) U.S. Cl. ........ 707/752; 707/753; 711/119; 711/149; 710/1; 710/266; 710/261; 712/28; 703/1; 703/25; 718/102

(58) Field of Classification Search .................. 707/752, 707/753; 711/119, 149; 710/1, 266, 261; 712/28; 703/25, 1; 706/10; 718/102
See application file for complete search history.

(56) References Cited

U.S. PATENT DOCUMENTS

| | | | | | |
|---|---|---|---|---|---|
| 4,604,686 | A | * | 8/1986 | Reiter et al. .................... 703/25 |
| 4,727,509 | A | * | 2/1988 | Johnson et al. ................ 360/15 |
| 4,837,735 | A | * | 6/1989 | Allen et al. ..................... 706/10 |
| 4,858,146 | A | * | 8/1989 | Shebini ............................ 703/1 |
| 5,006,978 | A | * | 4/1991 | Neches ......................... 718/102 |
| 5,146,590 | A | * | 9/1992 | Lorie et al. ........................... 1/1 |
| 5,842,207 | A | | 11/1998 | Fujiwara et al. |
| 6,173,384 | B1 | * | 1/2001 | Weaver ........................ 711/216 |
| 6,475,014 | B2 | * | 11/2002 | Tsuji et al. .................... 439/352 |
| 7,489,689 | B2 | * | 2/2009 | Ma et al. .................... 370/395.4 |
| 7,953,915 | B2 | * | 5/2011 | Ge et al. ........................ 710/266 |
| 2004/0236780 | A1 | * | 11/2004 | Blevins et al. ................ 707/102 |
| 2004/0249805 | A1 | * | 12/2004 | Chuvilskiy ....................... 707/3 |
| 2005/0105738 | A1 | | 5/2005 | Hashimoto |

(Continued)

OTHER PUBLICATIONS

Kim, et al., "Sort vs. Hash Revisited: Fast Join Implementation on Modern MultiCore CPUs ", Retrieved at <<http://www.vldb.org/pvldb/2/vldb09-257.pdf>>, Aug. 24-28, 2009, pp. 1-12.

(Continued)

*Primary Examiner* — Frantz Coby

(57) ABSTRACT

A concurrent grouping operation for execution on a multiple core processor is provided. The grouping operation is provided with a sequence or set of elements. In one phase, each worker receives a partition of a sequence of elements to be grouped. The elements of each partition are arranged into a data structure, which includes one or more keys where each key corresponds to a value list of one or more of the received elements associated with that key. In another phase, the data structures created by each worker are merged so that the keys and corresponding elements for the entire sequence of elements exist in one data structure. Recursive merging can be completed in a constant time, which is not proportional to the length of the sequence.

16 Claims, 5 Drawing Sheets

U.S. PATENT DOCUMENTS

| | | | |
|---|---|---|---|
| 2006/0136605 A1* | 6/2006 | Olukotun | 710/1 |
| 2007/0079021 A1 | 4/2007 | Dees et al. | |
| 2007/0239966 A1* | 10/2007 | Georgiou et al. | 712/28 |
| 2007/0250470 A1 | 10/2007 | Duffy et al. | |
| 2007/0294665 A1 | 12/2007 | Papakipos et al. | |
| 2008/0059597 A1* | 3/2008 | Blevins et al. | 709/207 |
| 2009/0037658 A1* | 2/2009 | Sistla | 711/119 |
| 2009/0070552 A1 | 3/2009 | Kanstein et al. | |
| 2009/0207179 A1 | 8/2009 | Huang et al. | |
| 2009/0235254 A1 | 9/2009 | Michael | |
| 2009/0248934 A1* | 10/2009 | Ge et al. | 710/261 |
| 2009/0259996 A1 | 10/2009 | Grover et al. | |
| 2011/0055492 A1* | 3/2011 | Wu et al. | 711/149 |

OTHER PUBLICATIONS

He, et al., "Silent Sharing: An Efficient Mechanism to Fast Sequential Program Execution on Chip Multicore Processor", Retrieved at <<http://ieeexplore.ieee.org/stamp/stamp.jsp?arnumber=05190067>>, Proceedings of the 2009 International Conference on Information Technology and Computer Science, vol. 01, Jul. 25-26, 2009, pp. 268-276.

The International Search Report for International Application No. PCT/US2010/054734 mailed Jun. 30, 2011 (5 pages).

The Written Opinion for International Application No. PCT/2010/054734 mailed Jun. 30, 2011 (3 pages).

* cited by examiner

GROUPING MECHANISM FOR MULTIPLE PROCESSOR CORE EXECUTION

BACKGROUND

Computer applications having concurrent threads executed on multiple processors present great promise for increased performance but also present great challenges to developers. The growth of raw sequential processing power has flattened as processor manufacturers have reached roadblocks in providing significant increases to processor clock frequency. Processors continue to evolve, but the current focus for improving processor power is to provide multiple processor cores on a single die to increase processor throughput. Sequential applications, which have previously benefited from increased clock speed, obtain significantly less scaling as the number of processor cores increase. In order to take advantage of multiple core systems, concurrent (or parallel) applications are written to include concurrent threads distributed over the cores. Parallelizing applications, however, is challenging in that many common tools, techniques, programming languages, frameworks, and even the developers themselves, are adapted to create sequential programs.

Grouping operations represent one area of applications where parallel improvements are available but largely unexploited. Grouping operations receive a sequence of elements and place those elements into predetermined groups, where each element in the sequence is inspected as it is grouped. At times, the sequence can contain millions of elements or more. The performance effect of sequentially grouping elements in the predetermined groups is that the time used to perform the grouping operation is related to the number of elements of the sequence.

SUMMARY

This summary is provided to introduce a selection of concepts in a simplified form that are further described below in the Detailed Description. This summary is not intended to identify particular features or essential features of the claimed subject matter, nor is it intended to be used to limit the scope of the claimed subject matter.

The present disclosure is directed to a concurrent grouping operation for execution on a multiple core processor. The grouping operation is provided with a sequence or set of elements. In one phase, each worker, such as a logical core or physical core in the processor, receives a partition of a sequence of elements to be grouped. The elements of each partition are arranged into a data structure, which includes one or more keys where each key corresponds to a value list of one or more of the received elements associated with that key. In another phase, the data structures created by each worker are merged so that the keys and corresponding elements for the entire sequence of elements exist in one data structure.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
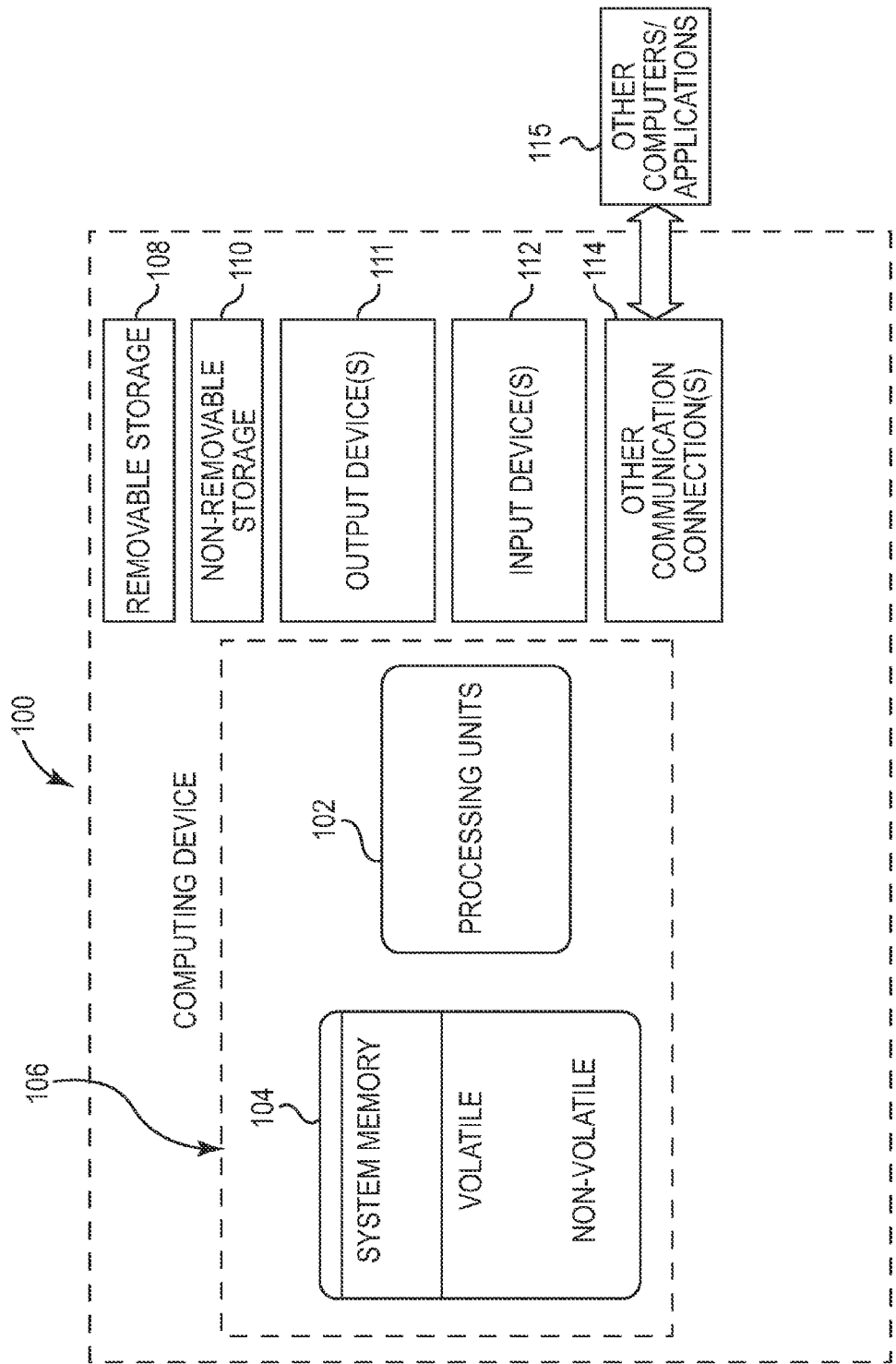
FIG. 1 is a block diagram illustrating an example computing device.

FIG. 1 illustrates an exemplary computer system that can be employed as an operating environment includes a computing device, such as computing device 100. In a basic configuration, computing device 100 typically includes a processor architecture having at least two processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment.

A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a thread identifier, and a thread context (or thread state) until the thread is scheduled. In parallel applications, threads can be concurrently executed on the processor 102.

Figure 2:
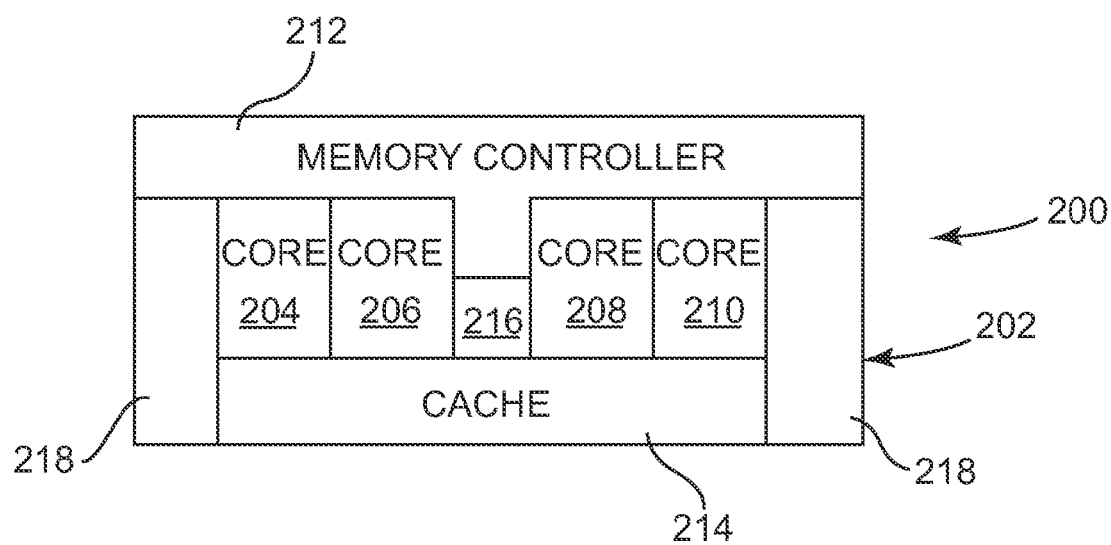
FIG. 2 is a schematic diagram illustrating an example of a multiple core processing system of the computing device of FIG. 1.

FIG. 2 an example multiple core processor 200 that can be implemented in the computing device 100 as processor 102 to concurrently execute threads. This example includes multiple cores implemented on a single die 202. The example multiple core processor 200 includes four physical processor cores 204, 206, 208, 210, or simply four physical cores, where each of the physical cores is available to process at least one application thread concurrently with at least one other physical core processing another thread. The physical cores 204, 206, 208, 210, are adjacent to a memory controller 212 and a cache 214 on the die 202 as shown. Each of the cores is associated with a cache hierarchy. In one example, the architecture of processor 102 includes cache in the physical core 204, 206, 208, 210 (such as L1 and L2 cache), an L3 cache in cache 214, memory 104 served by memory controller 212, and so on. Caches L1, L2, and L3 in this example can represent on-die memory because they are located on the die 202, whereas the memory hierarchy can further extend to off-die memory such as memory 104. In the example die 202, a queue 216 is disposed the die between the memory controller 212 and the cache 214. The die 202 can include other features 218 or combination of features such as a memory interfaces, miscellaneous input/output blocks, proprietary interconnects, expansion card interfaces, and the like.

Each physical core may be capable of efficiently and concurrently executing multiple threads of a concurrent process. Such physical cores are often referred to as "Simultaneous Multi-Threading," or simply "SMT," cores, and the concurrently executed threads on each physical core share hardware resources included within the single physical core. In the example of the multiple core processing system 200, each physical core is capable of multithreading. Each physical core capable of multithreading can present the operating system with as many logical cores as concurrently executing threads it supports. In the example multiple core processor 200, each physical core 204, 206, 208, 210 is capable of concurrently executing two threads, and thus provides the operating system with eight concurrent logical cores.

In some examples, a single processor (not shown) or the multiple core processor 102 can be included as part of multiple processor architectures depending performance considerations. Non-uniform memory access (NUMA) and symmetric multiprocessing (SMP) systems provide two common examples of available multiple processor architectures. Each processor or logical core within the multiprocessor architecture is capable of executing a thread. Multiple processor architectures can further be combined with other multiple processor architectures in distributed systems. The myriad of available or later developed combinations of logical cores, physical cores, processors, and multiple processor systems can be used implement the grouping mechanism, but the grouping mechanism is not limited to any particular processing system or architecture. Each unit capable of concurrently executing a thread or component of the concurrent grouping mechanism is generally described here as a "core" or a "worker."

Figure 3:
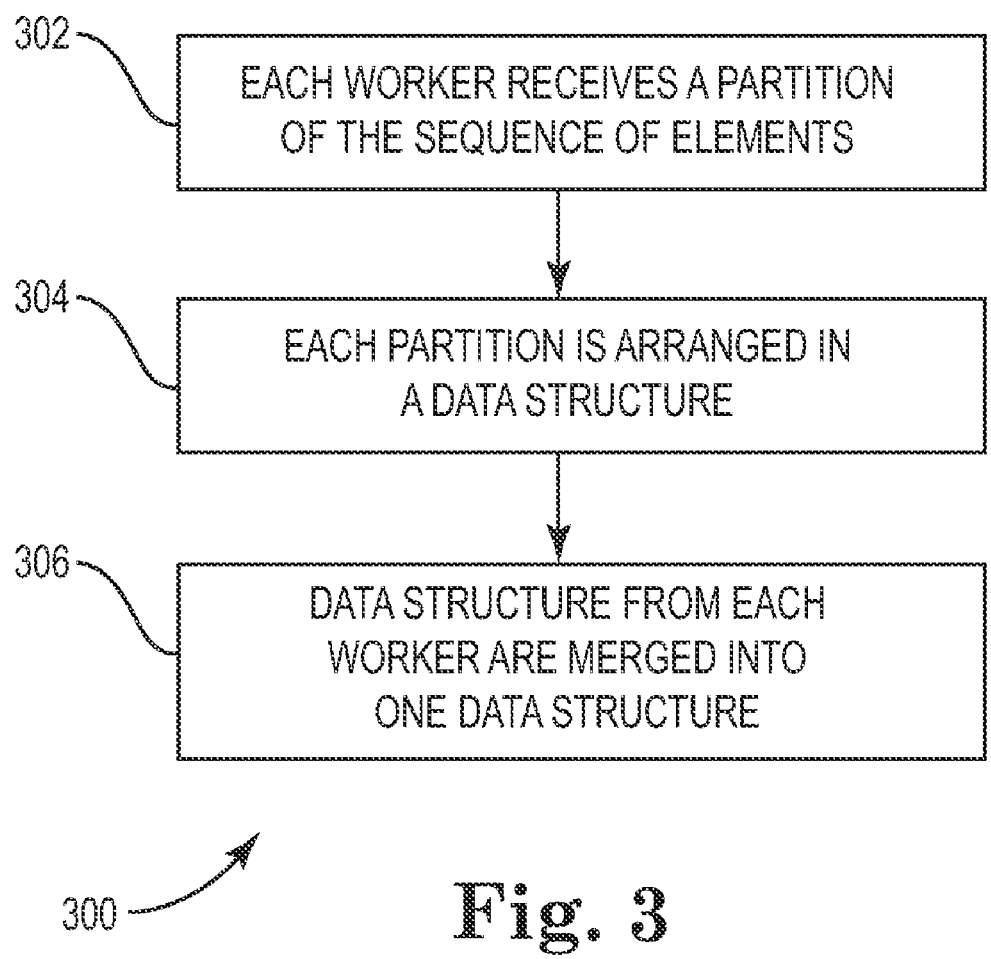
FIG. 3 is a block diagram illustrating an example method of a grouping operation used with a multiple core processing system such as the example of FIG. 2.

FIG. 3 illustrates an example method of a grouping operation 300. The grouping operation 300 is provided with a sequence or set of elements such as a sequence of values. In one phase, each worker, such as a logical core or physical core in processor 200, receives a partition of a sequence of elements to be grouped at 302. The elements of each partition are arranged into a data structure, which includes one or more keys where each key corresponds to a value list of one or more of the received elements associated with that key at 304. In another phase, the data structures created by each worker are merged so that the keys and corresponding elements for the entire sequence of elements exist in one data structure at 306.

The multiple core processor, or multi-core processor, for use with the grouping operation 300 includes a number of cores, such as eight in the processing system 200, each executing threads, or workers. At times (such as when the multiple core processor 200 is processing other applications, when the multiple core processor 200 includes idle cores, a combination of the two, or otherwise) only a subset of the cores of the processor are available to process the grouping operation. The operating system can provide data regarding the available cores for the grouping operation. The grouping operation 300 can also be implemented as a software product stored in a memory, or as a system including the processor 102 and memory 104 of the computing device 100.

The sequence of elements can be broadly defined, but the following examples are included for illustration. The input sequence is split into multiple partitions either with the grouping operation itself, with a preceding data-parallel operation, or the like. Each partition is assigned a corresponding core to process the partition in the grouping operation. In one example, the number of partitions corresponds with the number of available cores to process the grouping operation. In one example, the sequence can be of a predetermined length and the grouping operation is provided with the length prior to partitioning. In such a case, the grouping operation can separate the sequence into logical partitions such as partitions having generally the same amount of elements, partitions where processing of each are of generally same length of time, or other logical partition. In cases where the grouping operation is not provided with a predetermined length of elements, the grouping operation can apply an algorithm, either known or yet to be discovered, for partitioning elements over a given number of workers. The elements in the sequence can be of any type, and elements of a data type are used in the examples. For example, the sequence of elements can include integers, floating-point numbers, alphanumeric strings, and so on.

In addition to receiving the sequence of elements, the grouping operation also receives a key selector function as an input to provide the parameters of how the sequence of elements is to be grouped. The grouping operation evaluates the key selector function against the elements in the sequence of elements and obtains a key associated with each element. The key selector function can thus be represented as ƒ(element)=key In one example, the key selector function can be the least significant digit for each element in a sequence of integers. In another example, the key selector function is the first character in an alphanumeric string. All elements with the same, or common, key are grouped together in the data structure. In one example using C# (C-sharp) code, the data structure can be represented as Dictionary<TKey, LinkedList<TValue>>

Of course, other data structures can be used instead of a linked list. Each worker inspects every element in the corresponding partition to determine the appropriate key, looks up the appropriate linked list in the data structure, and inserts the element into the linked list. The location of each data structure in the memory hierarchy can be dictated by its size. In some examples, the data structure can be created in on-die memory for increased efficiency. In another example, each element could be pre-assigned a key in the received partition.

Figure 4:
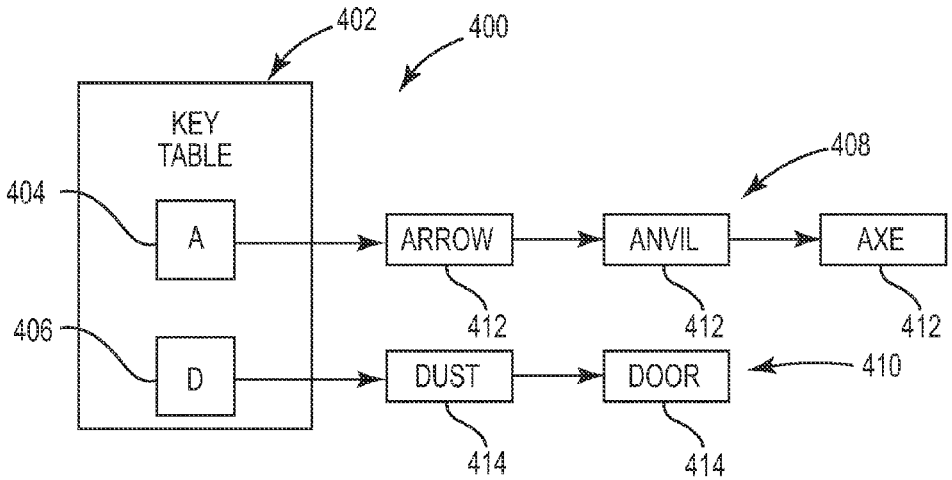
FIG. 4 is a schematic diagram illustrating an example data structure implementing a key table from the method of FIG. 3

FIG. 4 illustrates an example data structure 400 that includes a key table 402 having a set of keys 404, 406 where each key has an associated linked list, 408, 410, respectively. Key table 402 is an example result from evaluating the elements of a partitioned sequence assigned to a first worker. Each linked list 408, 410 includes elements, such as elements 412, 414, from the partitioned sequence having the key. The keys in the example key table 402 are determined from the first character in the alphanumeric string in the sequence including arrow, anvil, axe, dust, and door. According to a key selector function, the key 404 is "A" and the key 406 is "D."

In the example, each worker used in the grouping operation creates a key table based on the same key selector function, which is then applied to each element in the sequence partition assigned to that worker. Thus, in the case of using eight logical cores to process the grouping operation, the sequence will be separated into eight partitions, each partition is assigned to a corresponding logical core for grouping, and each corresponding logical core will construct a key table based on the key selector function and the elements in the assigned partition.

Figure 5:
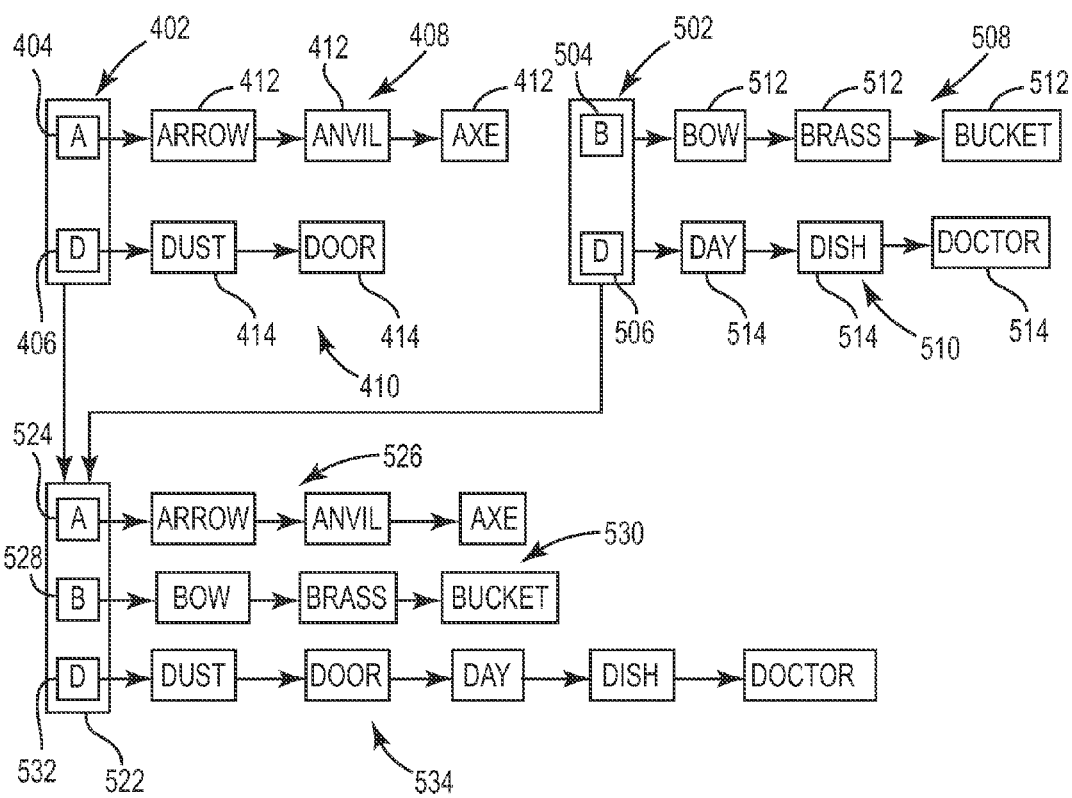
FIG. 5 is a schematic diagram illustrating an example of combining two key tables of FIG. 4.

FIG. 5 illustrates an example of two key tables, i.e., the key table 402, created by the first worker, and key table 502 created by a second worker. Key table 502 also includes a set of keys 504, 506 where each key has an associated linked list, 508, 510, respectively. Each linked list 508, 510 includes elements, such as elements 512, 514, having the same key from the partitioned sequence assigned to the second worker. The keys in the example key table 502 are also determined from the first character in the alphanumeric string in the sequence including bow, brass, bucket, day, dish, and doctor. According to a key selector function, the key 504 is "B" and the key 506 is "D." In the example, the number of elements in the partition assigned to the first worker differs from the number of elements assigned to the second worker.

After individual key tables have been constructed, the plurality of key tables created by the workers is merged. In one example, the data from a second key table is inserted into the first key table. If a key exists in the second table only, the key and value list pair, i.e., the key and associated linked list pair, is inserted into the first table. In examples where a new key table is created, the key and value list pairs are inserted into the new key table if the key exists in one table only. If the same key exists in more than one key table, the two linked lists are concatenated and associated with the appropriate key in the merged table. For example, the data from key table 502 is inserted into key table 402 creating a merged key table 522 in FIG. 5. Key 404 and associated linked list 408 are included in the merged key table 522 as key 524 and corresponding value list 526. Key 504 and associated linked list 508 are inserted into the merged key table 522 as key 528 and corresponding value list 530. Keys 406 and 506 exist in both tables 402 and 502 and are placed in the merged table as key 532. The linked lists 410, 510 associated with keys 406 and 506 are concatenated to form value list 534 in merged table 522.

In other examples, more than two key tables can be merged together. In cases where the number of different keys is relatively small compared to the number of elements in the entire sequence, the key tables can be combined sequentially. In other words, the key tables of two workers are merged into an larger key table, the key table of a third worker is merged with the larger key table to form a still larger key table, and so on until the key tables of created by each of the workers from their corresponding partitions is merged into a single key table suitable for output from the grouping operation.

Additionally, groups of key tables can be recursively merged to form a single key table suitable for output. For example, small groups of key tables can be concurrently merged to form additional key tables, and the additional key tables can be recursively merged to form still additional key tables, and so on, until a single key table remains.

Figure 6:
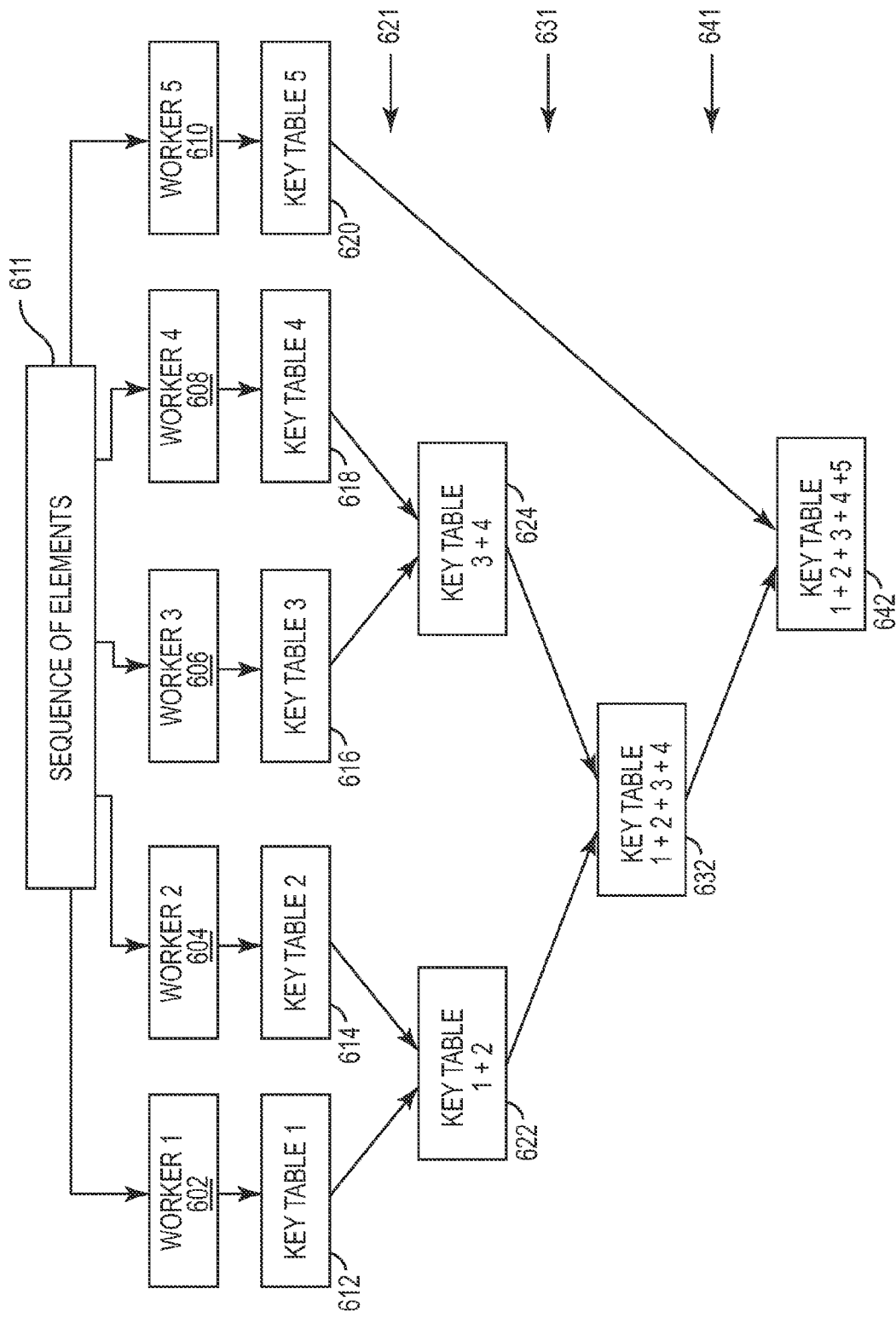
FIG. 6 is a schematic diagram illustrating an example of recursively combining key tables of FIG. 4 in a multiple core processing system such as the example of FIG. 2.

FIG. 6 illustrates to recursive grouping operation 600 with five workers 602, 604, 606, 608, 610. Each worker receives a partition of a sequence 611 of elements to be grouped and concurrently with the other workers creates a corresponding key table 612, 614, 616, 618, 620, respectively. Small groups, or subgroups, of key tables are concurrently merged together to create combined key tables. In some architectures, advantages can be gained if the small groups are selected by "distance" of the workers to each other. (Distance is a metric often measured by hops, bandwidth, latency, or the like.) In some multiple core processors or processing systems, the cores quickly gain access to the memory they are close to, while memory that is farther away is accessed less quickly. Key tables 612 and 614 are merged to form a combined key table 622 in a first level 621. Concurrent with the merging to form combined key table 622, key tables 616 and 618 are merged to form a combined key table 624 also in the first level 621. A key table that is not ready for output as a complete key table including each element of the sequence is described as a partial key table. In the example algorithm used, pairs of partial key tables are recursively merged together. Multiple pairs of partial key tables are merged concurrently. In this particular example, however, partial key table 620 from worker 610 is not merged with another table because there are an odd number of workers.

Small groups of partial key tables are recursively merged together until they form a complete key table. During the recursive merging, multiple small groups of partial key tables are concurrently merged together in the multiple core processor. At the first recursive level 631, three partial key tables remain, i.e., key tables 622, 624, and 620 as carried over from the first level. Key tables 622 and 624 are merged together to form key table 632. Again, an odd number of key tables exist at this level, and partial key table 620 is carried into the next recursive level, i.e., the second recursive level 641. At the second recursive level 641, two partial key tables remain, i.e., 632 and key table 620 that are then merged together to form key table 642. Key table 642 is a complete key table because it contains all of the elements in the sequence 611, and thus is suitable for output from the grouping operation 600.

An advantage of using recursive merging over grouping operations of other grouping operations is that the merging can be done in constant time relative to the number of level of merging rather than in a time dependent upon the amount of elements in the sequence. In cases where pairs of partial key tables are merged together at each level for a given number of workers W, the following expression is used to determine the number of levels used to generate a complete key table, such as $2^{N-1}<W\leqq2^N$, or alternatively:

$$N=ceil(\log 2(W))$$

where N is the number of levels used to generate a complete key table. The example of FIG. 6 shows five workers using three levels of merging (a first level 621, a first recursive level 631, and a second recursive level 641). If eight workers are used to create eight key tables, four partial key tables remain after concurrently merging pairs of key tables. Two partial key tables remain after concurrently merging pairs of partial key tables in a first recursive level. A complete key table remains after merging the final two partial key tables in a second recursive level. Thus, in cases where the number of workers is between 5 and 8, inclusive, 3 levels of merges are used to create the final key table. The more workers that are concurrently used to create key tables based on smaller partitions, the time for creating each key table is generally decreased. But the number of merge levels used to create the complete table increases only logarithmically. Accordingly, the grouping operations disclosed can be significantly improve performance over grouping operations of the prior art.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of grouping a sequence of elements, comprising:
    receiving multiple partitions of a sequence of elements, wherein available cores of a multiple core processor each receive a separate partition of the multiple partitions for processing;
    concurrently grouping the elements of each separate partition into a key table of at least one value lists of elements, wherein the elements in each value list include a common key; and
    concurrently merging key tables together over a plurality N of recursive levels to form a final key table such that all keys and value lists corresponding with each key are included in the final key table;
    for a number of available cores W, the plurality N of recursive levels is determined from N=ceil(log2(W)).

2. The method of claim 1 wherein each of the elements of the separate partition of elements has an associated key and elements having the same key are included in the value list of elements.

3. The method of claim 2 wherein each key table includes a plurality of keys each having a corresponding value list of elements with that key.

4. The method of claim 2 wherein the keys are generated with a key selector function operating on each of the elements of the separate partition.

5. The method of claim 1 wherein the merging includes generating a new key table.

6. The method of claim 1 wherein the merging includes expanding an existing key table.

7. The method of claim 1 wherein the merging of key tables includes,
    adding keys and corresponding value lists into the key table if the key is present in only one key table of the key tables being merged; and
    concatenating value lists of common keys present in more than one key table of the key tables being merged.

8. The method of claim 1 wherein the partial key tables are sequentially merged together to form the complete key table.

9. The method of claim 1 wherein any key table not merged in a recursive level is carried into a next recursive level.

10. A computer readable storage medium storing computer executable instructions for controlling a computing device to perform a method comprising:
    receiving multiple partitions of a sequence of elements, wherein the multiple partitions correspond with a number of available cores in a multiple core processor, wherein each core receives a separate partition for processing and wherein each element includes a corresponding key;
    concurrently grouping the elements of each separate partition into a corresponding data structure having at least one key, wherein each key in the data structure corresponds with a value list of elements; and
    concurrently merging a preselected number of data structures together to form a corresponding merged data structure repeatedly over a plurality of recursive levels until all keys and their corresponding value lists from each of the data structures are included in the complete data structure, the concurrently merging including:
        adding keys and corresponding value lists into the data structure if the key is present in only one of the preselected number of key table subgroups; and
        concatenating value lists of keys present in all of the preselected number of key table subgroups;
        recursively and concurrently combining the preselected number of partial key tables until the preselected number of partially combined key tables remain; and
        combining the preselected number of partially combined key tables together during a final recursive level to form a complete key table including all of the elements in the sequence of elements grouped together by common keys.

11. The computer readable storage medium of claim 10 wherein the keys are generated with a key selector function operating on each of the elements of the separate partition.

12. The computer readable storage medium of claim 10 wherein the data structure includes a linked list.

13. The computer readable storage medium of claim 10 wherein the preselected number is two and concurrently merging data structures over a plurality of recursive levels includes:
    combining pairs of data structures by adding together and concatenating value lists of the pairs of data structures to form a plurality of partial data structures; and combining a pair of partial data structures by adding together and concatenating value lists of the partial data structures to form the complete data structure.

14. The computer readable storage medium of claim 13 wherein repeatedly merging data structures includes:
    combining a first data structure with a second data structures from a set consisting of a first, second, and third data structure by adding together and concatenating value lists of the of the first and second data structures to form a partial data structure; and
    combining the partial data structure with the third data structure by adding together and concatenating value lists of the data structures to form the complete data structure.

15. The computer readable storage medium of claim 10 wherein repeatedly merging data structures includes sequentially combining together the data structures from each core to form the complete data structure.

16. A computer readable storage medium storing a grouping operation including computer executable instructions for controlling a computing device having a multiple core processor including a plurality of cores configured to execute a concurrent application, the grouping operation configured to perform a method comprising:
    receiving multiple partitions of a sequence of elements, wherein the multiple partitions correspond with a number of available cores in the multiple core processor,
    assigning each of the multiple partitions to a corresponding available core for processing such that each available core processes a separate partition of the multiple partitions;
    determining a key for each element in each separate partition;
    grouping the elements of each of the separate partitions into a corresponding key table subgroup through concurrent processing, wherein each key table subgroup includes at least one key corresponding with a value list of elements;
    concurrently combining pairs of the key table subgroups together to form corresponding partial key tables during a first recursive level, wherein the combining includes,
        adding keys and corresponding value lists into the data structure if the key is present in only one of the two key table subgroups; and
        concatenating value lists of keys present in both key table subgroups;
    recursively and concurrently combining pairs of partial key tables until two partially combined key tables remain; and
    combining the two partially combined key tables together during a final recursive level to form a complete key table including all of the elements in the sequence of elements grouped together by common keys.

* * * * *